US011972917B2

(12) United States Patent
Nakamura et al.

(10) Patent No.: US 11,972,917 B2
(45) Date of Patent: Apr. 30, 2024

(54) INTERRUPTION DEVICE

(71) Applicant: Panasonic Intellectual Property Management Co., Ltd., Osaka (JP)

(72) Inventors: Masato Nakamura, Hyogo (JP); Shun Ito, Hyogo (JP); Shinya Kimoto, Osaka (JP); Katsuya Uruma, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 32 days.

(21) Appl. No.: 17/637,193

(22) PCT Filed: Sep. 24, 2020

(86) PCT No.: PCT/JP2020/036011

§ 371 (c)(1),
(2) Date: Feb. 22, 2022

(87) PCT Pub. No.: WO2021/065666

PCT Pub. Date: Apr. 8, 2021

(65) Prior Publication Data

US 2022/0285114 A1 Sep. 8, 2022

(30) Foreign Application Priority Data

Oct. 4, 2019 (JP) ................................ 2019-184156

(51) Int. Cl.
*H01H 39/00* (2006.01)

(52) U.S. Cl.
CPC .................................. *H01H 39/00* (2013.01)

(58) Field of Classification Search
CPC ..................................................... H01H 39/00
USPC ......................................................... 337/114
See application file for complete search history.

(56) References Cited

U.S. PATENT DOCUMENTS 3,571,776 A * 3/1971 Kozacka ................ H01H 85/10
337/161
3,838,375 A * 9/1974 Frind ..................... H01H 85/18
337/276
3,932,717 A * 1/1976 Dike .................... H01H 39/004
200/61.08

(Continued)

FOREIGN PATENT DOCUMENTS

CN 108369878 A 8/2018
JP 62-055816 3/1987

(Continued)

OTHER PUBLICATIONS

Extended (Supplementary) European Search Report dated Oct. 20, 2022, issued in counterpart EP application No. 20871950.0. (8 pages).

(Continued)

*Primary Examiner* — Anatoly Vortman
(74) *Attorney, Agent, or Firm* — WHDA, LLP

(57) ABSTRACT

A disconnect device includes: a conductor connectable to an external conductive path; a housing that has an internal space and accommodates at least a part of the conductor; and a cooling body that is disposed in the internal space and cools an arc generated in the internal space. The cooling body includes a porous body configured with at least one of a metal oxide and an inorganic oxide.

16 Claims, 12 Drawing Sheets

(56) References Cited

U.S. PATENT DOCUMENTS

| | | | | | |
|---|---|---|---|---|---|
| 3,958,206 | A * | 5/1976 | Klint | H01H 85/38 337/296 |
| 4,709,222 | A * | 11/1987 | Morita | H01H 85/18 337/276 |
| 5,420,560 | A * | 5/1995 | Hanada | H01H 85/18 337/276 |
| 5,535,842 | A * | 7/1996 | Richter | H01H 39/006 200/61.08 |
| 6,194,988 | B1 | 2/2001 | Yamaguchi et al. | |
| 6,556,119 | B1 * | 4/2003 | Lell | H01H 37/323 337/182 |
| 7,498,531 | B2 * | 3/2009 | Knauss | H01H 39/006 200/61.08 |
| 8,653,386 | B2 * | 2/2014 | Ukon | B23D 15/145 200/61.08 |
| 8,957,335 | B2 * | 2/2015 | Sprenger | H01H 39/006 200/61.04 |
| 9,425,010 | B2 * | 8/2016 | Hentschel | H01H 39/006 |
| 10,418,212 | B2 * | 9/2019 | Warenits | H01H 9/32 |
| 10,714,276 | B2 * | 7/2020 | Moszynski | H01H 39/006 |
| 11,081,303 | B2 * | 8/2021 | Volkmann | B23D 15/145 |
| 11,239,039 | B2 * | 2/2022 | Tazarine | H01H 85/0241 |
| 11,527,367 | B2 * | 12/2022 | Burkett | H01H 1/504 |
| 2004/0041682 | A1 * | 3/2004 | Pasha | H01H 39/006 337/401 |
| 2005/0083164 | A1 * | 4/2005 | Caruso | H01H 39/006 337/159 |
| 2010/0328014 | A1 * | 12/2010 | Suzuki | H01H 39/006 337/30 |
| 2013/0220095 | A1 * | 8/2013 | Ukon | H01H 39/006 83/639.1 |
| 2016/0343524 | A1 | 11/2016 | Gaudinat et al. | |
| 2016/0351363 | A1 | 12/2016 | Gaudinat et al. | |
| 2019/0051478 | A1 | 2/2019 | Warenits et al. | |
| 2021/0066007 | A1 | 3/2021 | Fukuda et al. | |

FOREIGN PATENT DOCUMENTS

| | | |
|---|---|---|
| JP | 2000-021278 | 1/2000 |
| JP | 2017-507469 | 3/2017 |
| WO | 2017/066816 A1 | 4/2017 |
| WO | 2019/188582 | 10/2019 |

OTHER PUBLICATIONS

International Search Report of PCT application No. PCT/JP2020/036011 dated Dec. 1, 2020.

English Translation of Chinese Search Report dated Jul. 18, 2023 for the related Chinese Patent Application No. 202080068383.X.

* cited by examiner

INTERRUPTION DEVICE

TECHNICAL FIELD

The present disclosure relates to a disconnect device, and more particularly to a disconnect device that cuts off a conductive path.

BACKGROUND ART

The circuit breaker described in PTL 1 includes: at least one conductor designed to be connected to an electric circuit; a housing; a matrix; a punch; and an actuator using a pyrotechnic device. The actuator is designed to move the punch from a first position to a second position when ignited. The punch and the matrix break the at least one electrical conductor into at least two separate portions when the punch moves from the first position to the second position.

CITATION LIST

Patent Literature

PTL 1: Japanese Translation of PCT International Application No. 2017-507469

SUMMARY OF THE INVENTION

In such a disconnect device as the circuit breaker described in PTL 1, when a conductor is broken while a large current is flowing through the conductor, an arc is sometimes generated at the broken part.

An object of the present disclosure is to provide a disconnect device in which it is possible to accelerate extinction of an arc.

A disconnect device according to an aspect of the present disclosure includes: a conductor connectable to an external conductive path; a housing that has an internal space accommodating at least a part of the conductor; and a cooling body that is disposed in the internal space and configured to cool an arc generated in the internal space. The cooling body includes a porous body configured with at least one of a metal oxide and an inorganic oxide.

DESCRIPTION OF EMBODIMENT

Hereinafter, a disconnect device according to an exemplary embodiment of the present disclosure will be described with reference to the accompanying drawings. However, the following exemplary embodiment described below is only a part of various exemplary embodiments of the present disclosure. The following exemplary embodiment can be variously changed according to a design and the like as long as the object of the present disclosure can be achieved. Further, each figure described in the following exemplary embodiment is a schematic view, and a size and thickness of each component in the figure and the ratio of the size and thickness do not necessarily reflect an actual dimensional ratio.

(1) Exemplary Embodiment

(1.1) Outline

Figure 1:
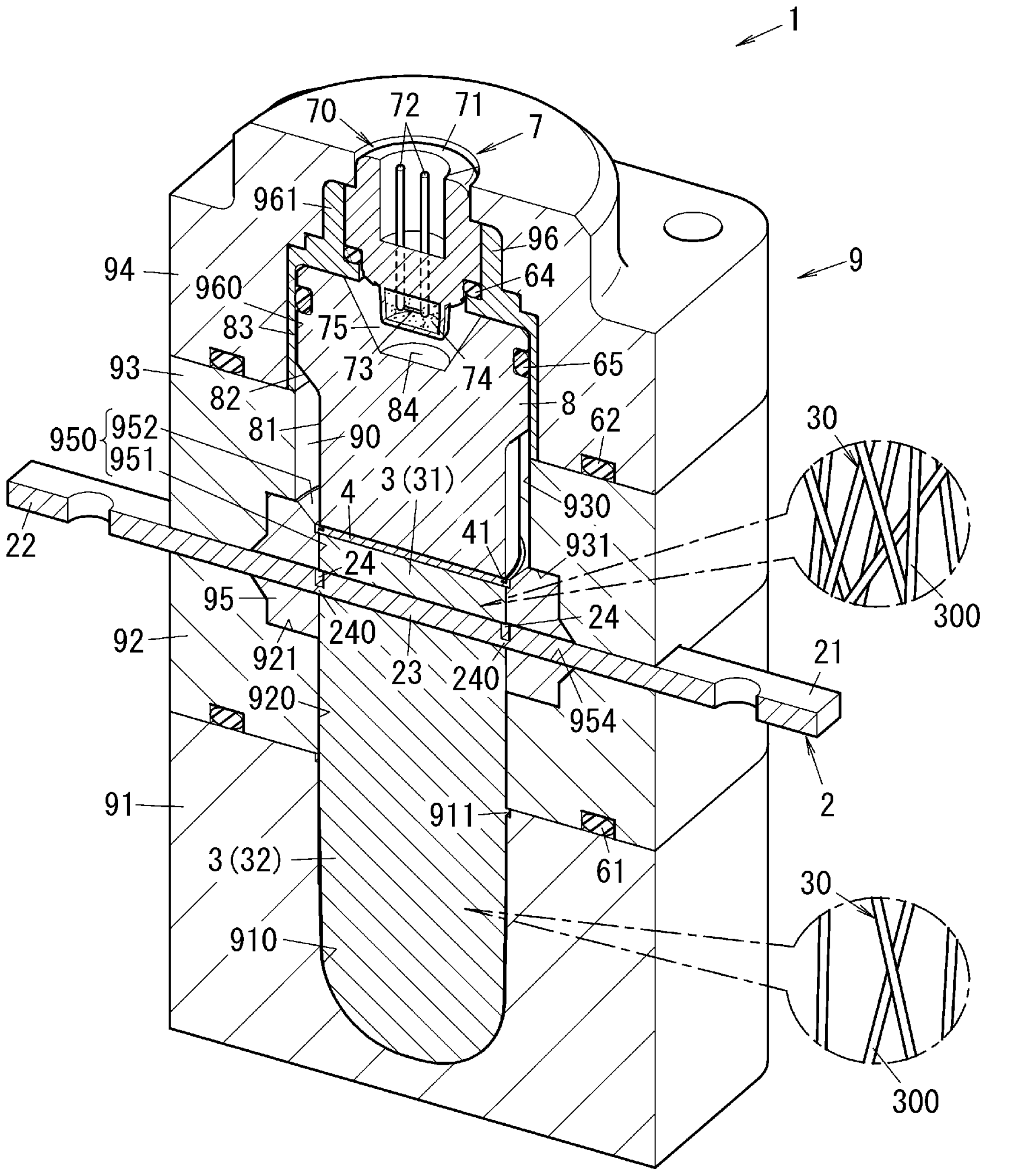
FIG. 1 is a cross-sectional perspective view of a disconnect device according to an exemplary embodiment.

As illustrated in FIG. 1, disconnect device 1 of the present exemplary embodiment includes conductor 2, cooling body 3, and housing 9.

Conductor 2 is connected to an external conductive path. Through conductor 2, a current supplied from an external conductive path can flow. At least a part of conductor 2 is accommodated in internal space 90 of housing 9.

Cooling body 3 is disposed in internal space 90 of housing 9. Cooling body 3 cools an arc generated in internal space 90.

For example, when conductor 2 is broken in internal space 90 while a current is flowing through conductor 2, an arc may be generated in internal space 90. Cooling body 3 comes into contact with the arc generated in internal space 90. As a result, the arc is cooled, and extinction of the arc is accelerated. When the arc comes into contact with cooling body 3, a metal gas included in the arc adheres to cooling body 3. Therefore, since cooling body 3 is provided, it is possible to reduce an increase in a pressure in internal space 90 caused by the generation of the arc.

Cooling body 3 includes porous body 30. Porous body 30 constituting cooling body 3 is configured with at least one of a metal oxide and an inorganic oxide.

Porous body 30 in the present disclosure may be one member having a large number of fine pores, or may be an aggregate of one or a plurality of members arranged so as to form gaps in the one member or between the one member and other members (which members themselves may or may not have pores). Porous body 30 in disconnect device 1 of the present exemplary embodiment is an aggregate of a plurality of fibers 300 (see FIG. 1). In disconnect device 1 of the present exemplary embodiment, porous body 30 is deformable. Fibers 300 constituting porous body 30 are also deformable. Porous body 30 may be configured with only fibers 300, or may further have one or a plurality of side chain parts branched from fibers 300. In the present disclosure, whether or not porous body 30 includes side chain parts, it is expressed that "porous body 30 has a fibrous structure".

As described above, in disconnect device 1 of the present exemplary embodiment, cooling body 3 for cooling the arc includes porous body 30. Therefore, the surface area can be increased, and the arc can easily come in contact with cooling body 3. As a result, disconnect device 1 of the present exemplary embodiment can accelerate extinction of the arc. Note that, in the present disclosure, to accelerate extinction of an arc can include to shorten a duration of a generated arc or to reduce energy of the generated arc.

In addition, a metal oxide and an inorganic oxide hardly generate gas even when melted. Therefore, when porous body 30 constituting cooling body 3 is configured with at least one of a metal oxide and an inorganic oxide as in disconnect device 1 of the present exemplary embodiment, cooling body 3 is less likely to generate a gas even when being melted by heat of the arc. Therefore, even if an arc is generated in internal space 90, a pressure in internal space 90 of housing 9 is less likely to increase. Therefore, with disconnect device 1 of the present exemplary embodiment, it is possible to reduce occurrence of a problem caused by an increase in the pressure in internal space 90.

(1.2) Configuration

Disconnect device 1 of the present exemplary embodiment will be described in more detail with reference to FIGS. 1 to 7.

Disconnect device 1 includes conductor 2, cooling body 3, housing 9, and in addition, restriction member 4, drive mechanism 7, and operation pin 8. Conductor 2 includes first terminal portion 21, second terminal portion 22, and separation portion 23.

Disconnect device 1 is provided in, for example, an electric vehicle or the like. Disconnect device 1 is provided, for example, in an electric circuit connecting between a power supply of an electric vehicle and a motor, and switches between supplying and not-supplying of a current from the power supply to the motor. An operation of drive mechanism 7 in disconnect device 1 is controlled by, for example, a controller such as an electronic control unit (ECU) provided in the electric vehicle.

Hereinafter, for convenience of description, a direction which is a moving direction of operation pin 8 and in which operation pin 8 and conductor 2 face each other (vertical direction in FIG. 5) is referred to as an up-and-down direction, a side of conductor 2 as viewed from operation pin 8 is referred to as a lower side, and a side of operation pin 8 as viewed from conductor 2 is referred to as an upper side. A direction which is a longitudinal direction of conductor 2 and in which first terminal portion 21 and second terminal portion 22 are arranged (right-and-left direction in FIG. 5) is referred to as a right-and-left direction. In addition, a direction orthogonal to both the up-and-down direction and the right-and-left direction (a direction orthogonal to the paper surface of FIG. 5) is referred to as a front-and-rear direction. Note that these directions are for convenience of description of the structure of disconnect device 1, and do not specify the orientation or the like of disconnect device 1 when disconnect device 1 is used. Note that in the present disclosure, the description will be given using terms indicating directions such as "up", "down", "upper", and "lower". However, these terms merely indicate a relative positional relationship, and do not limit the present disclosure.

Figure 3:
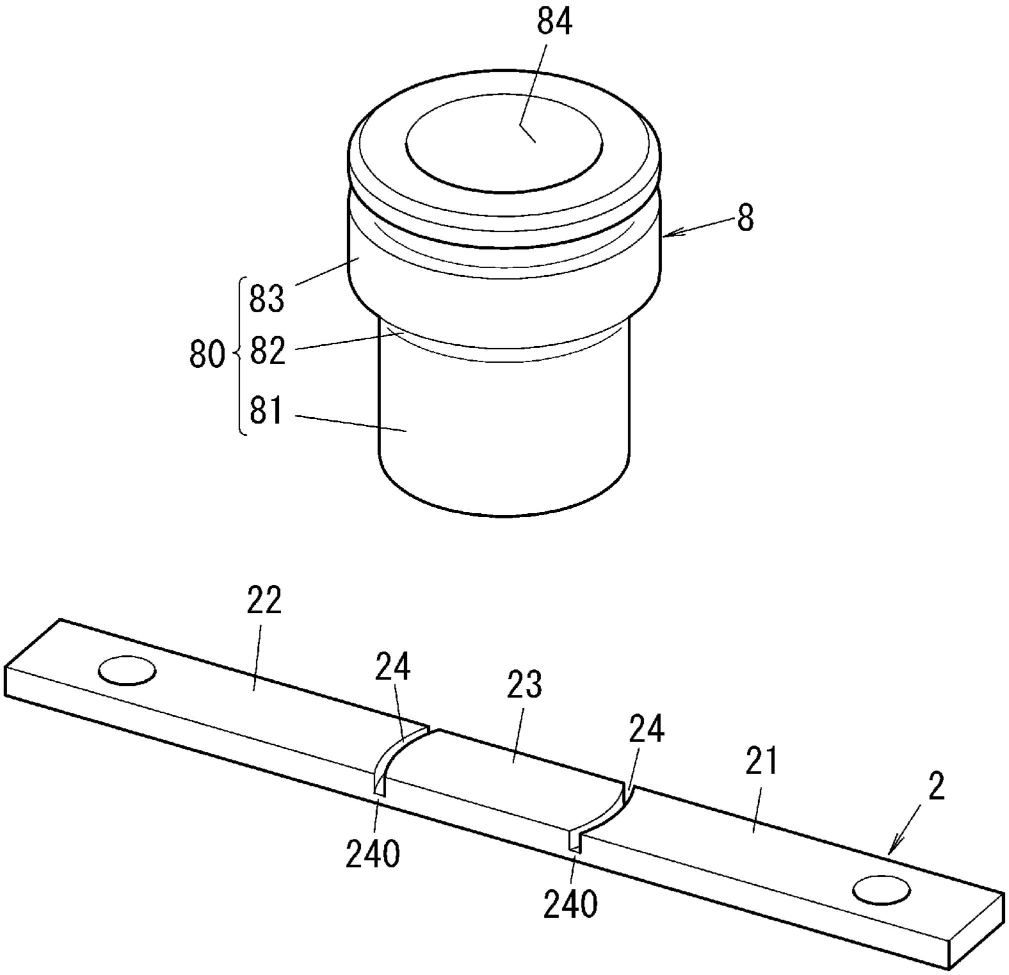
FIG. 3 is a perspective view of a main part of the above disconnect device.
Figure 5:
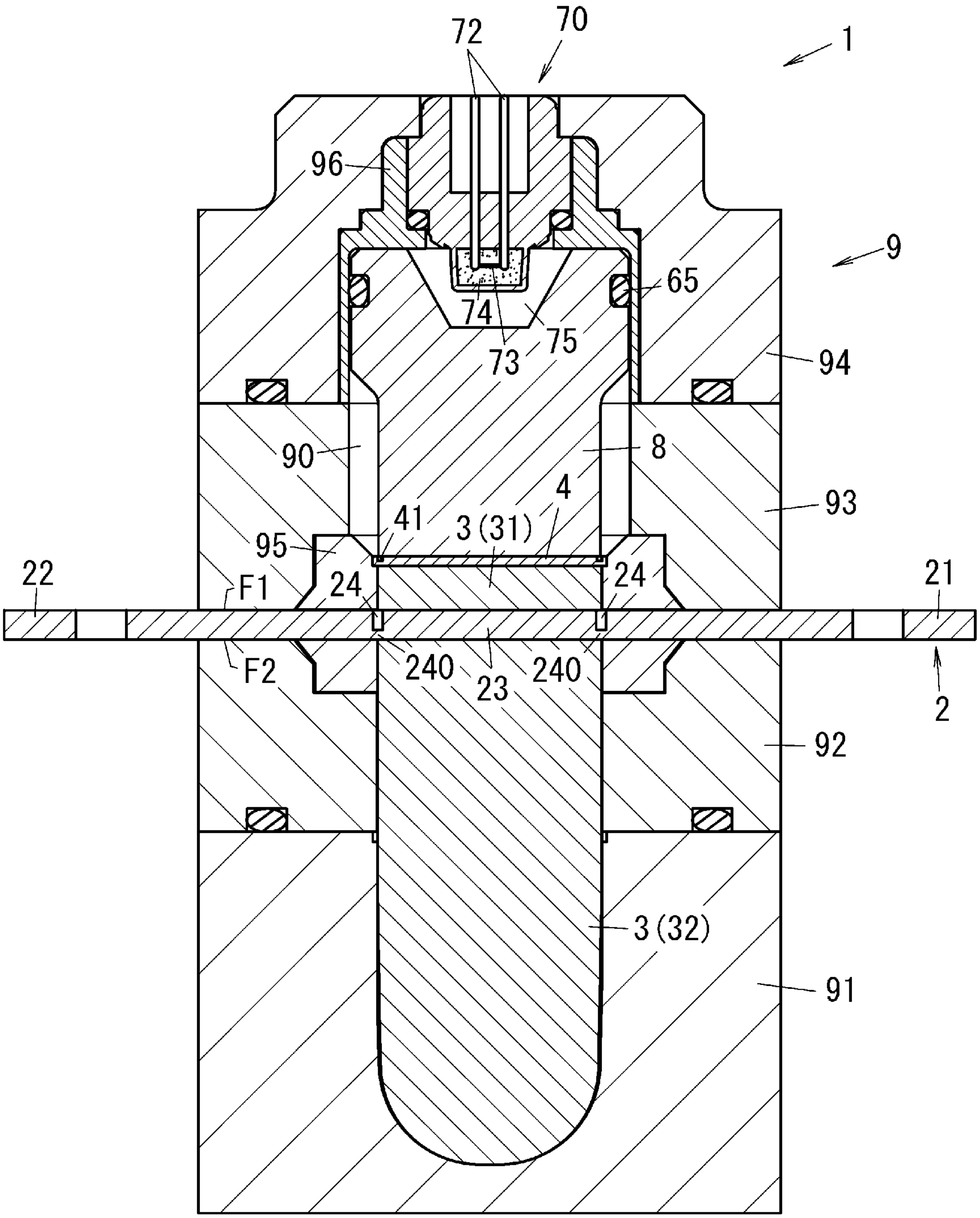
FIG. 5 is a cross-sectional view illustrating the above disconnect device before an operation pin is driven.

Conductor 2 is formed of, for example, copper. As illustrated in FIGS. 3 and 5, conductor 2 is formed in a rectangular plate shape having a thickness in the up-and-down direction. As illustrated in FIG. 3, first terminal portion 21, second terminal portion 22, and separation portion 23 have the same width (a dimension in the front-and-rear direction) and thickness (a dimension in the up-and-down direction).

First terminal portion 21 and second terminal portion 22 are portions of conductor 2 which are each to be electrically connected to an external conductive path (an electric circuit of an electric vehicle). Each of first terminal portion 21 and second terminal portion 22 has, for example, a through-hole. Each of first terminal portion 21 and second terminal portion 22 can be electrically connected to an external conductive path by passing a bolt through the through-hole and coupling the bolt to a terminal of the external conductive path. First terminal portion 21 and second terminal portion 22 do not have to have a through-hole, and any terminal structure can be adopted.

Separation portion 23 of conductor 2 is a portion connecting between first terminal portion 21 and second terminal portion 22. First terminal portion 21, second terminal portion 22, and separation portion 23 are integrally formed. In the longitudinal direction of conductor 2, first terminal portion 21, separation portion 23, and second terminal portion 22 are arranged in this order.

Conductor 2 has two grooves 24 arranged in the longitudinal direction of conductor 2. Each groove 24 is formed on first surface F1 of the following two surfaces: first surface F1 (see FIG. 5) of conductor 2; and second surface F2 (see FIG. 5) opposite to first surface F1. First surface F1 faces operation pin 8. Hereinafter, "first surface F1" is sometimes referred to as "upper surface F1". A depth direction of each groove 24 is along a thickness direction of conductor 2. In the present exemplary embodiment, the thickness direction of conductor 2 is the up-and-down direction. Each of two grooves 24 has a partially cylindrical shape (arc shape) when viewed from above. Two grooves 24 are formed concentrically. Two grooves 24 have the same outer (the side far from the center) diameter and the same inner (the side close to the center) diameter.

Two grooves 24 define boundary portion 240 between first terminal portion 21 and separation portion 23, and boundary portion 240 between second terminal portion 22 and separation portion 23. Boundary portions 240 have a rupture strength less than or equal to rupture strengths of first terminal portion 21 and second terminal portion 22. The rupture strength of boundary portions 240 is less than or equal to a rupture strength of separation portion 23. Therefore, boundary portions 240 are more easily broken than the other part of conductor 2.

Housing 9 is formed of, for example, resin. Housing 9 has a space (internal space 90) therein. Internal space 90 is a sealed space isolated from the outside of housing 9.

Figure 2:
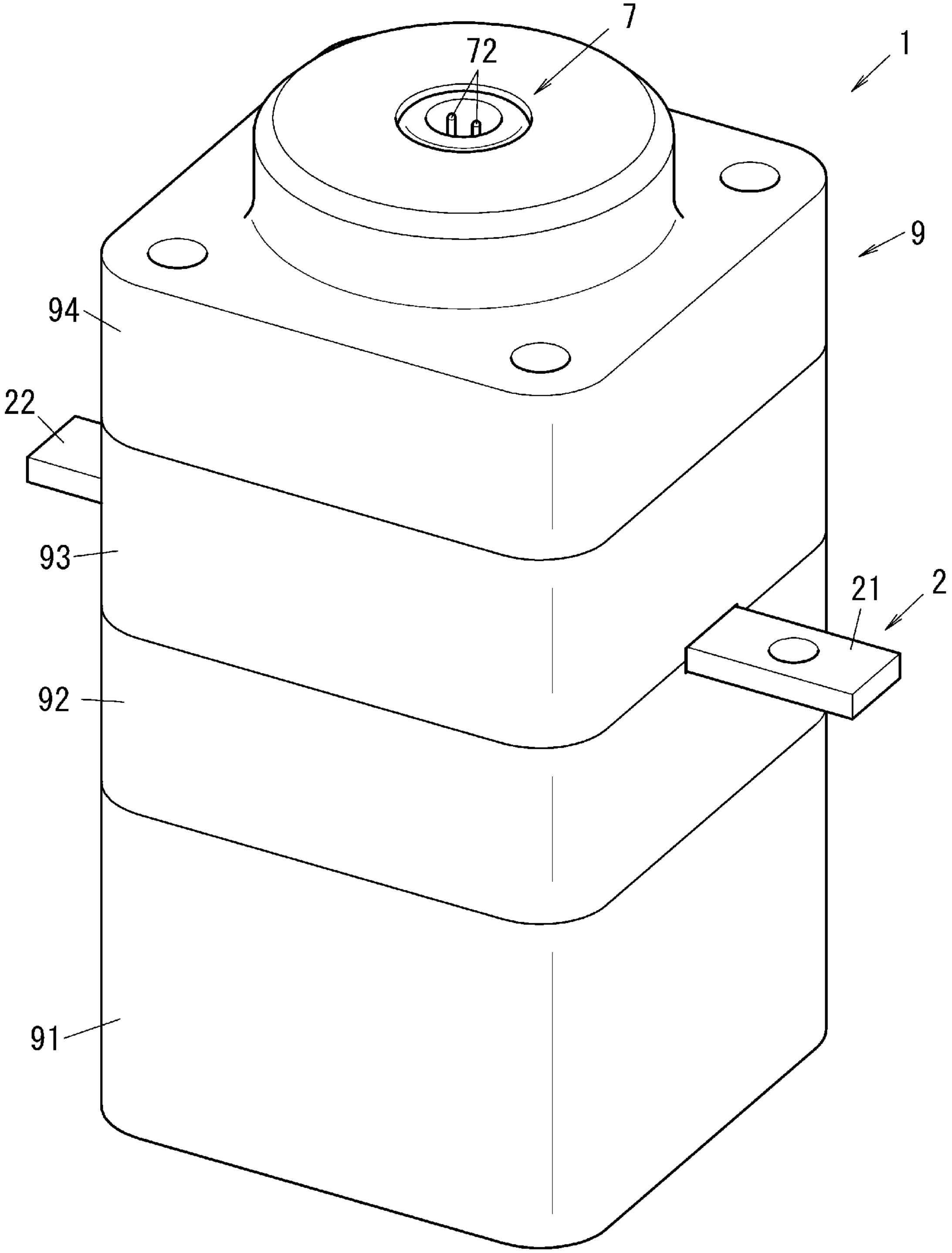
FIG. 2 is a perspective view of the above disconnect device.
Figure 4:
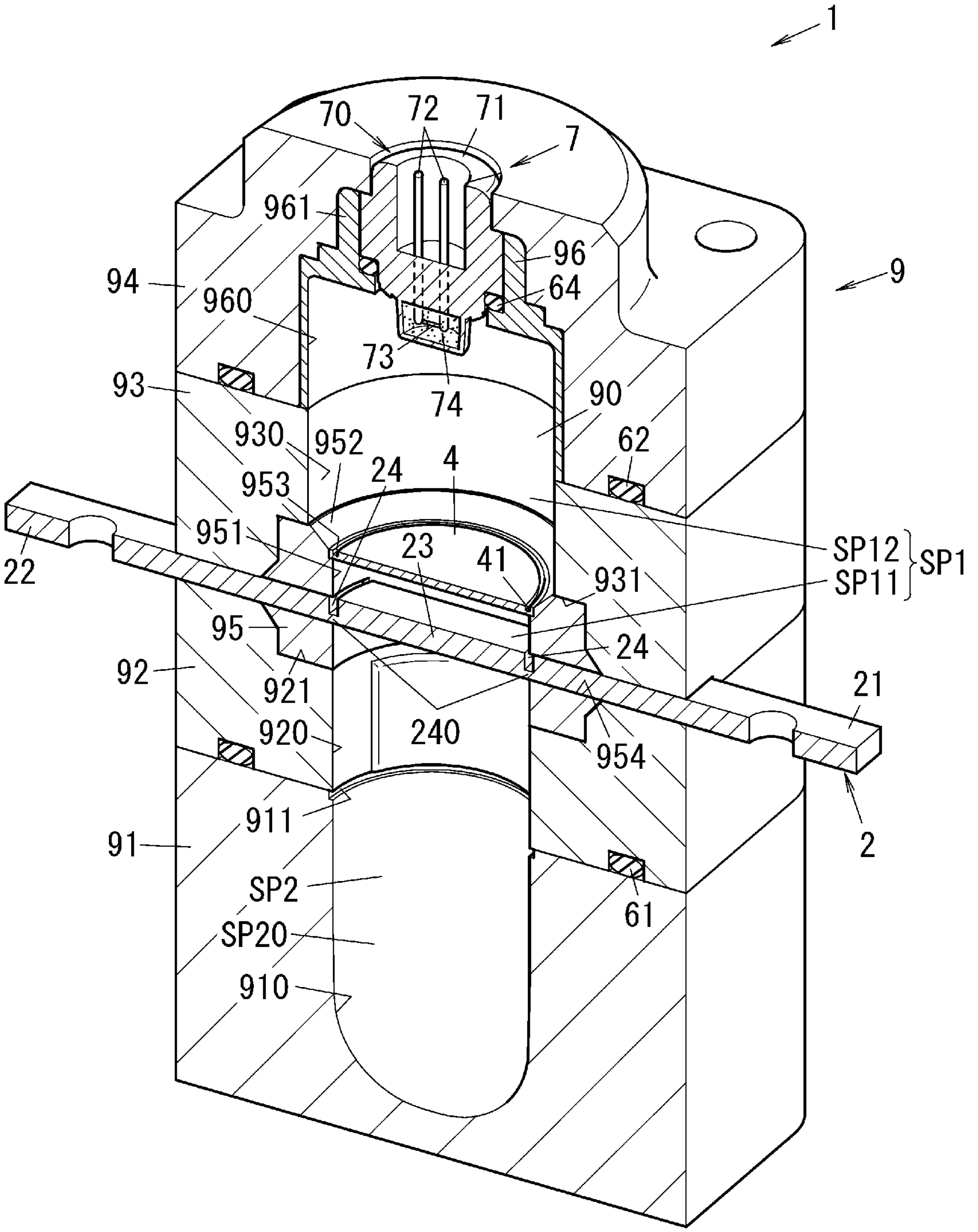
FIG. 4 is a cross-sectional perspective view of the above disconnect device with some members removed.

As illustrated in FIGS. 1, 2, and 4, housing 9 includes first body 91, second body 92, third body 93, fourth body 94, first holder 95, and second holder 96.

First body 91 has a rectangular box shape. At the center of an upper surface of first body 91, there is formed recess 910 that has an inner peripheral surface with a circular cross section and is opened on the upper side. A bottom surface of recess 910 is a curved surface.

Second body 92 has a rectangular box shape. Second body 92 is stacked on the upper surface of first body 91. At the center of second body 92, there is formed through-hole 920 having a circular cross section and extending in the up-and-down direction. Through-hole 920 has a diameter substantially equal to a diameter of recess 910 of first body 91.

In an upper surface of second body 92, recess 921 having a diameter larger than the diameter of through-hole 920 is formed around through-hole 920. In recess 921, a lower side part of first holder 95 is fitted. In a lower surface of second body 92 (the surface in contact with the upper surface of first body 91), there is formed an annular recess. In this recess is fitted O-ring 61.

In the upper surface of second body 92, there are formed fitting recesses extending in the right-and-left direction. In the fitting recesses is fitted a lower side part of conductor 2.

Third body 93 has a rectangular box shape. Third body 93 is stacked on the upper surface of second body 92. At the center of third body 93, there is formed through-hole 930 having a circular cross section and extending in the up-and-down direction.

On a lower surface of third body 93, recess 931 having a diameter larger than the diameter of through-hole 930 is formed around through-hole 930. In this recess 931 is fitted an upper side part of first holder 95.

In the lower surface of third body 93, there are formed fitting recesses extending in the right-and-left direction. In these fitting recesses is fitted an upper side part of conductor 2.

Fourth body 94 has a shape in which are combined a rectangular box-shaped portion and a columnar portion formed on an upper surface of the rectangular box-shaped portion. Fourth body 94 is stacked on an upper surface of third body 93.

At the center of fourth body 94, there is formed a through-hole extending in the up-and-down direction. In a lower surface of fourth body 94 (the surface in contact with the upper surface of third body 93), there is formed an annular recess. In this recess is fitted O-ring 62.

First holder 95 is formed in a hollow cylindrical shape whose axis is along the up-and-down direction. First holder 95 has through-hole 950 extending in the up-and-down direction at the center of first holder 95. Through-hole 950 includes first hole 951 and second hole 952 that are connected to each other in the up-and-down direction. First hole 951 has a circular cross section. First hole 951 extends in the up-and-down direction and has a constant diameter along the up-and-down direction. A diameter of first hole 951 is substantially equal to the diameter of through-hole 920 of second body 92. Second hole 952 has a circular cross section. Second hole 952 extends upward from an upper end of first hole 951, and has a tapered hole shape whose diameter is gradually larger toward the upper side. That is, an inner peripheral surface of first holder 95 has, at the upper end thereof, a partially conical inclined surface whose diameter is gradually smaller toward the lower side. A diameter of an upper end of second hole 952 is substantially equal to the diameter of through-hole 930 of third body 93.

On the inner peripheral surface of first holder 95 (an inner surface of the through-hole 950), annular step 953 (see FIG. 4) is formed in a part where first hole 951 and second hole 952 are connected to each other.

As illustrated in FIG. 1, first holder 95 is held between second body 92 and third body 93 in such a manner that the lower side part of first holder 95 is fitted in recess 921 of second body 92 and the upper side part of first holder 95 is fitted in recess 931 of third body 93.

In a state where first holder 95 is fitted in recess 921, the lower end of first hole 951 of first holder 95 and an upper end of the inner peripheral surface of through-hole 920 of second body 92 are continuous to each other. In a state where first holder 95 is fitted in recess 931, the upper end of second hole 952 of first holder 95 and a lower end of the inner peripheral surface of through-hole 930 of third body 93 are continuous to each other.

In each of right and left side walls of first holder 95, there is formed through-hole 954 that passes through the corresponding side wall in the right-and-left direction. A cross-sectional shape of through-holes 954 is substantially the same as a cross-sectional shape of conductor 2. Conductor 2 is held by first holder 95 by being inserted in right and left through-holes 954 of first holder 95.

As illustrated in FIGS. 1 and 4, the diameter of first hole 951 of through-hole 950 of first holder 95 is substantially equal to a diameter of grooves 24 of conductor 2. More specifically, the diameter of first hole 951 is smaller than an outer diameter of grooves 24 and larger than an inside diameter of grooves 24. Conductor 2 is held by first holder 95 at a position where grooves 24 face the inner surface of first hole 951. In other words, regarding conductor 2, an end of first terminal portion 21 closer to separation portion 23 and an end of second terminal portion 22 closer to separation portion 23 are held by housing 9 (first holder 95).

In a state where conductor 2 passes through through-hole 954 and first holder 95 is fitted in recesses 921, 931, conductor 2 is fitted in the fitting recess in the upper surface of second body 92 and in the fitting recess in the lower surface of third body 93 (see FIG. 4).

Separation portion 23 of conductor 2 is accommodated in internal space 90 of housing 9. As illustrated in FIG. 1, conductor 2 is disposed such that separation portion 23 faces a lower surface of operation pin 8. Regarding conductor 2, an end part of first terminal portion 21 on the opposite side to separation portion 23 and an end part of second terminal portion 22 on the opposite side to separation portion 23 are exposed to the outside of housing 9.

As illustrated in FIG. 1, on an outer peripheral surface of first holder 95, first holder 95 has, in a periphery of a part where through-hole 954 is formed, a larger diameter portion having a larger diameter than the other part of the outer peripheral surface. The diameter of the larger diameter portion is smaller at a position farther away from through-hole 954 (further upward or downward). The larger diameter portion improves strength of first holder 95.

First holder 95 may be formed of a material having higher heat resistance than a material of second body 92 and a material of third body 93.

Second holder 96 is disposed in the through-hole of fourth body 94. An outer peripheral surface of second holder 96 has such a shape that the outer peripheral surface of second holder 96 is along an inner peripheral surface of the through-hole of fourth body 94.

Second holder 96 has recess 960 that has an inner peripheral surface having a circular cross section and is opened on the lower side. The inner peripheral surface of recess 960 has a diameter substantially equal to the diameter of through-hole 930 of third body 93. In a state where second holder 96 is disposed in fourth body 94, the lower end of the inner peripheral surface of recess 960 of second holder 96 and an upper end of the inner peripheral surface of through-hole 930 of third body 93 are continuous to each other.

In addition, second holder 96 includes cylindrical accommodation wall 961 at an upper end thereof. Inside accommodation wall 961, there is disposed gas generator 70 for drive mechanism 7. Between accommodation wall 961 and gas generator 70, there is disposed O-ring 64. Internal space 90 of housing 9 is sealed with gas generator 70 disposed on accommodation wall 961.

As illustrated in FIG. 4, internal space 90 (sealed space) of housing 9 includes first space SP1 and second space SP2. First space SP1 and second space SP2 are continuous to each other.

First space SP1 is a space surrounded by the followings: a part, of the inner surface of through-hole 950 of first holder 95, on the upper side with respect to conductor 2 (before being broken); the inner surface of through-hole 930 of third body 93; the inner surface of recess 960 of second holder 96; and a lower surface of gas generator 70. That is, first space SP1 of internal space 90 is a space on the upper side of conductor 2. In first space SP1 is disposed operation pin 8.

Second space SP2 is a space surrounded by the followings: a part, of the inner surface of through-hole 950 of first holder 95, on the lower side with respect to conductor 2 (before being broken); the inner surface of through-hole 920 of second body 92; and the inner surface of recess 910 of first body 91. That is, second space SP2 of internal space 90 is a space on the lower side of conductor 2. Second space SP2 is a space where separation portion 23 separated from first terminal portion 21 and second terminal portion 22 is to be accommodated. For this reason, hereinafter, second space SP2 is also referred to as "accommodation space SP20".

Drive mechanism 7 includes gas generator 70. Drive mechanism 7 moves operation pin 8 in conjunction with a pressure of gas generated by gas generator 70. Gas generator 70 is disposed inside accommodation wall 961. Gas generator 70 generates gas by combustion of fuel 74. As illustrated in FIG. 1, gas generator 70 includes fuel 74, case 71, two pin electrodes 72 for energizing, and heat generating element 73.

Case 71 has a hollow columnar shape. Case 71 has an internal space at its lower end. The internal space of case 71 accommodates fuel 74 and heat generating element 73. Regarding case 71, for example, a cross groove is formed in a lower side wall constituting the internal space, and a part where the groove is formed is more easily broken than the other part.

Fuel 74 burns and generates gas when the temperature rises. Fuel 74 is gunpowder such as nitrocellulose, lead azide, black gunpowder, or glycidyl azide polymer.

Two pin electrodes 72 are held by case 71. A first end of each of two pin electrodes 72 is exposed to the outside of housing 9. The first ends are upper ends of pin electrodes 72. A second end of each of two pin electrodes 72 is connected to heat generating element 73. The second ends are lower ends of pin electrodes 72. That is, heat generating element 73 is positioned between two pin electrodes 72. Heat generating element 73 generates heat by being energized. Heat generating element 73 is, for example, a nichrome wire, an alloy wire containing iron, chromium, and aluminum, or another type of wire.

Gas generator 70 generates gas by burning fuel 74. More specifically, in gas generator 70, when a current is supplied between two pin electrodes 72, heat generating element 73 generates heat to increase a temperature of fuel 74 around heat generating element 73. As a result, fuel 74 burns and generates gas.

As shown in FIG. 1, operation pin 8 is disposed in internal space 90 of housing 9. Operation pin 8 is disposed between gas generator 70 and separation portion 23. Operation pin 8 has electrical insulating properties. Operation pin 8 includes, for example, a resin as a material.

Operation pin 8 includes a first columnar portion, a second columnar portion, and a third columnar portion. The first columnar portion has a columnar shape and is located on a side close to separation portion 23 (on the lower side). The third columnar portion has a columnar shape having an outside diameter larger than a diameter of the first columnar portion, and is located on a side farther from separation portion 23 (on the upper side). The second columnar portion connects between the first columnar portion and the third columnar portion and has a truncated cone shape that gradually increases in diameter from the first columnar portion toward the third columnar portion. That is, as shown in FIG. 3, outer peripheral surface 80 of operation pin 8 includes first side surface 81 corresponding to an outer surface of the first columnar portion, second side surface (inclined surface) 82 corresponding to an outer surface of the second columnar portion, and third side surface 83 corresponding to an outer surface of the third columnar portion.

First side surface 81 has a diameter substantially equal to the diameter of first hole 951 of through-hole 950 of first holder 95. Third side surface 83 has a diameter substantially equal to the diameter of the inner peripheral surface of recess 960 of second holder 96, and substantially equal to the diameter of through-hole 930 of third body 93. Second side surface (inclined surface) 82 has an inclination substantially equal to an inclination of second hole 952 of through-hole 950 of first holder 95.

As illustrated in FIG. 3, in an outer peripheral surface of the third columnar portion of operation pin 8, there is formed an annular recess. In this recess is disposed O-ring 65 (see FIG. 1). An outer edge of O-ring 65 is in contact with the inner surface of recess 960. By frictional force between O-ring 65 and operation pin 8 and between O-ring 65 and second holder 96, operation pin 8 is held in first space SP1 of housing 9. In an upper surface of operation pin 8, there is formed recess 84.

Operation pin 8 is disposed in first space SP1 of housing 9 such that a first surface (upper surface) in the height direction faces gas generator 70. In a state where operation pin 8 is disposed in place, an airtight space (pressurizing chamber 75) is formed in housing 9 to be surrounded by recess 84 of operation pin 8, the lower surface of gas generator 70, and the inner surface of recess 960 (see FIG. 1).

Operation pin 8 has a height (a dimension in the up-and-down direction) smaller a dimension of first space SP1 in the up-and-down direction. Operation pin 8 is disposed in first space SP1 of housing 9 such that a gap (hereinafter, also referred to as "gap space SP11") is created between a top of operation pin 8 (a surface facing separation portion 23 of conductor 2, in other words, a lower surface) in the moving direction and conductor 2.

Cooling body 3 is disposed in internal space 90 of housing 9. Cooling body 3 has electrical insulating properties. In disconnect device 1 of the present exemplary embodiment, cooling body 3 is disposed in both first space SP1 and second space SP2 in internal space 90. That is, cooling body 3 is disposed on both sides in the thickness direction (up-and-down direction) of conductor 2 (separation portion 23) in internal space 90. Cooling body 3 is disposed around conductor 2. Cooling body 3 is in contact with conductor 2 (separation portion 23). Cooling body 3 is disposed in a projection region of separation portion 23 in the moving direction of operation pin 8.

More specifically, in first space SP1, cooling body 3 is disposed in the gap (gap space SP11) between conductor 2 (separation portion 23) and operation pin 8. Cooling body 3 is disposed in entire gap space SP11. Hereinafter, a portion of cooling body 3 disposed in gap space SP11 is also referred to as first cooling body 31. First cooling body 31 is in contact with an upper surface of conductor 2 (separation portion 23).

In addition, cooling body 3 is disposed in second space SP2 (accommodation space SP20). Cooling body 3 is disposed in entire accommodation space SP20. Hereinafter, a portion of cooling body 3 disposed in accommodation space SP20 is also referred to as second cooling body 32. Second cooling body 32 is in contact with a lower surface of conductor 2 (separation portion 23).

Cooling body 3 may be disposed in a space between each side surface of conductor 2 and an inner peripheral surface of housing 9.

As described above, cooling body 3 includes porous body 30. Porous body 30 constituting cooling body 3 contains at least one of a metal oxide and an inorganic oxide. In the present description, a material of porous body 30 (cooling body 3) is at least one of a metal oxide and an inorganic oxide.

The metal oxide as a material of cooling body 3 includes, for example, at least one of aluminum oxide, zirconia oxide, and iron oxide. The inorganic oxide as a material of cooling body 3 contains, for example, at least one of silicon oxide, zinc oxide, and magnesium oxide. The metal oxide or inorganic oxide as the material of cooling body 3 is preferably a substance that does not generate gas even when melted. Note that the expression "no gas is generated even when melted" is not limited to generating no gas at all even when melted, and gas may be slightly generated as long as the gas does not affect a performance of disconnect device 1 (for example, to an extent that the pressure in internal space 90 is not excessively increased).

In disconnect device 1 of the present exemplary embodiment, the material of cooling body 3 contains aluminum oxide ($Al_2O_3$) and silicon oxide ($SiO_2$) as main components. The ratio of aluminum oxide to silicon oxide is, for example, in the range of from about 7:3 to 9:1 inclusive. The material of cooling body 3 may include, for example, mullite (aluminosilicate mineral).

In disconnect device 1 of the present exemplary embodiment, as described above, porous body 30 constituting cooling body 3 is constituted by a plurality of fibers 300. In this description, fibers 300 are so-called mineral wool, and more particularly alumina fibers mainly composed of aluminum oxide. For example, an average diameter (fiber diameter) of the mineral wool is about several μm to several tens of and the density (true specific gravity) is about 3 g/cm$^3$ to 4 g/cm$^3$.

The materials of first cooling body 31 and second cooling body 32 may be the same or different from each other. Between first cooling body 31 and second cooling body 32, a ratio between aluminum oxide and silicon oxide may be the same or different. In disconnect device 1 of the present exemplary embodiment, first cooling body 31 and second cooling body 32 are formed of the same material (aluminum oxide and silicon oxide), and the ratios between aluminum oxide and silicon oxide are the same.

In disconnect device 1 of the present exemplary embodiment, the density of cooling body 3 is about 0.1 g/cm$^3$ to 0.3 g/cm$^3$. A percentage of void (percentage of gaps included in cooling body 3 to a volume of cooling body 3) of cooling body 3 is, for example, about 90% to 95%. Therefore, cooling body 3 is compressively deformable when external force is applied. When cooling body 3 is disposed to be in contact with conductor 2, cooling body 3 preferably has such a density that cooling body 3 is not crushed by its own weight and is not separated from conductor 2. However, such a density that cooling body 3 is not crushed by its own weight and is not separated from conductor 2 can depend on a volume of cooling body 3, a frictional force between cooling body 3 and the inner surface of internal space 90 of housing 9, and the like.

First cooling body 31 and second cooling body 32 may have the same density or different densities. In disconnect device 1 of the present exemplary embodiment, first cooling body 31 has higher density than second cooling body 32. In other words, the density of cooling body 3 is higher in the portion (first cooling body 31) disposed in the gap (gap space SP11) than in the portion (second cooling body 32) disposed in accommodation space SP20. In disconnect device 1 of the present exemplary embodiment, the filling rate of the alumina fibers is different between first cooling body 31 and second cooling body 32, so that the density of first cooling body 31 is higher than the density of second cooling body 32 (see FIG. 1).

Restriction member 4 is disposed in internal space 90 of housing 9. Restriction member 4 is disposed in first space SP1. Restriction member 4 has electrical insulating properties. In this description, restriction member 4 is made of resin.

Restriction member 4 has a disk shape. Restriction member 4 has an outside diameter larger than the diameter of first hole 951. The outside diameter of restriction member 4 is substantially equal to a diameter of annular step 953 of first holder 95. Restriction member 4 is fitted in step 953 and is thus held by first holder 95. Restriction member 4 is disposed between operation pin 8 and conductor 2 (separation portion 23). Restriction member 4 is disposed between operation pin 8 and cooling body 3 (first cooling body 31). Restriction member 4 separates first space SP1 into gap space SP11 and disposition space SP12 in which operation pin 8 is disposed. Since restriction member 4 is disposed in place, first cooling body 31 disposed in gap space SP11 is less likely to move toward disposition space SP12. In short, restriction member 4 restricts a movement of cooling body 3.

In a surface (upper surface), of restriction member 4, facing operation pin 8, there is formed groove 41 concentric with an outer edge of restriction member 4 as viewed from above. Groove 41 has a diameter substantially equal to a diameter of the lower surface of operation pin 8. Groove 41 faces an outer edge of the lower surface of operation pin 8. When receiving force in a thickness direction (up-and-down direction), restriction member 4 is easily broken at a portion of groove 41. Note that, regarding restriction member 4, instead of or in addition to groove 41, there may be formed, in a surface (lower surface) facing first cooling body 31, a groove similar to groove 41.

Operation pin 8 is driven by drive mechanism 7. Operation pin 8 is driven by the pressure of the gas generated by gas generator 70 and moves in a moving direction (downward) toward conductor 2.

Figure 6:
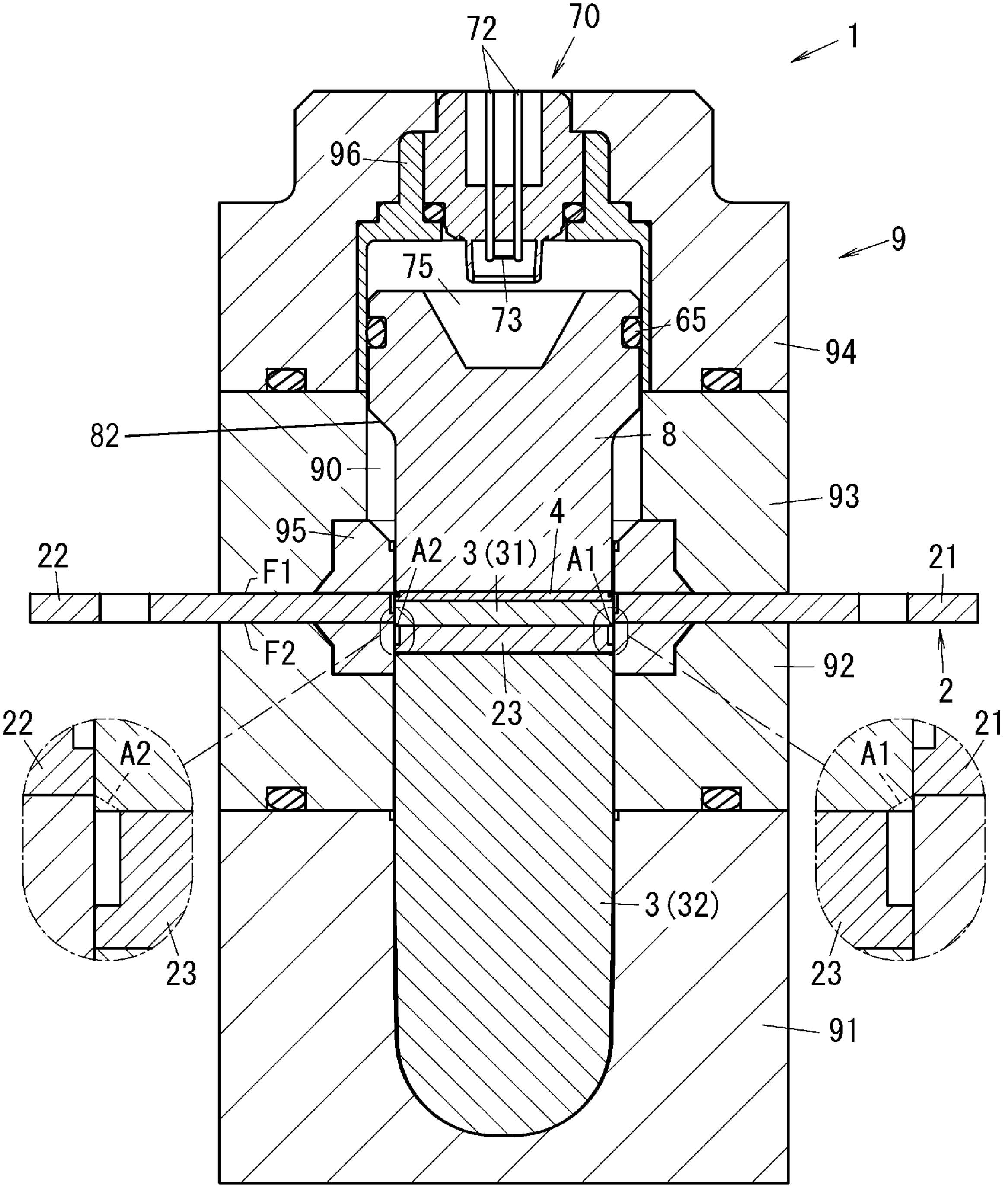
FIG. 6 is a cross-sectional view illustrating the above disconnect device immediately after the operation pin is driven.
Figure 7:
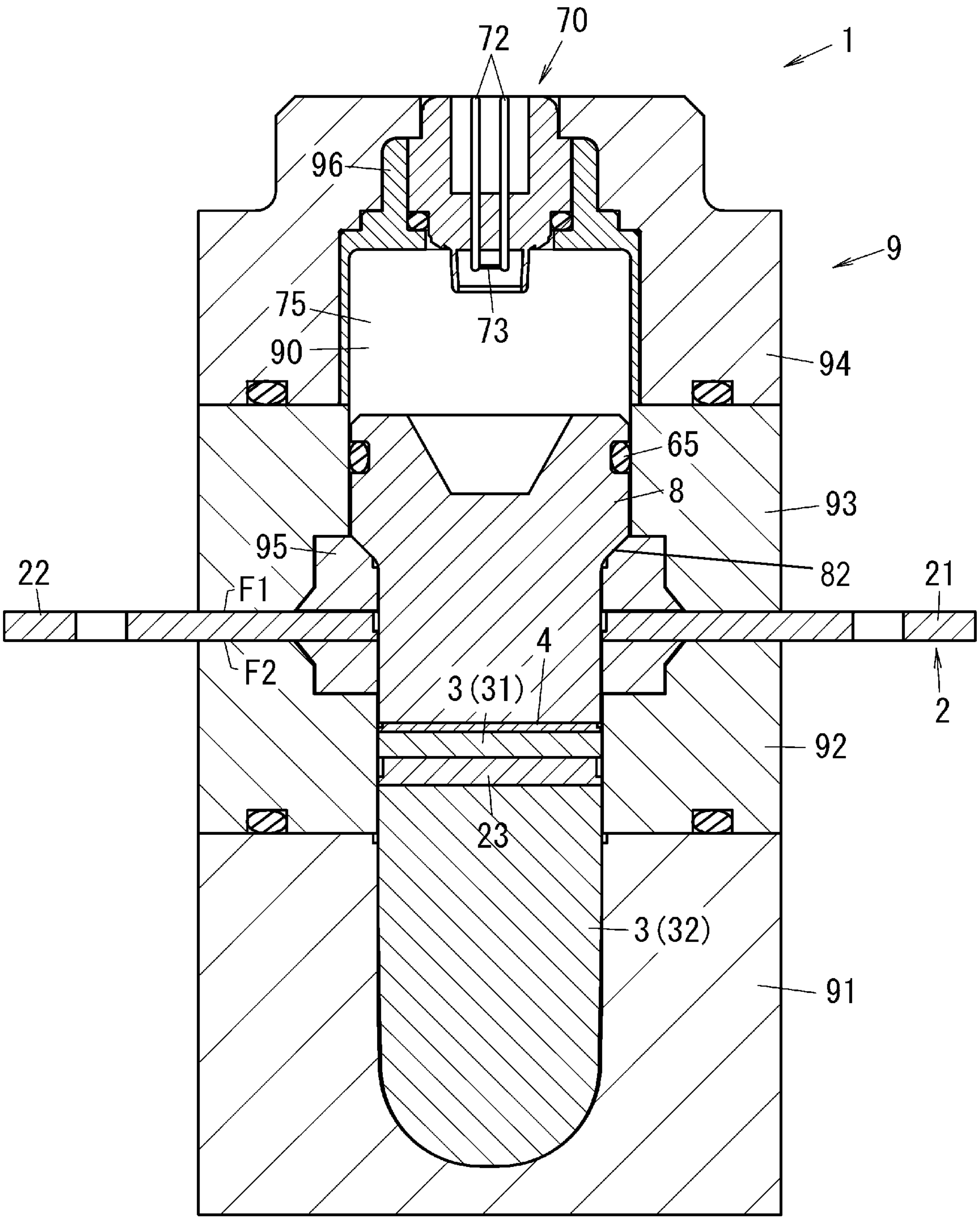
FIG. 7 is a cross-sectional view illustrating the above disconnect device after a movement of the operation pin is completed.

Operation pin 8 is driven by drive mechanism 7 and moves downward, thereby separating separation portion 23 from at least one of first terminal portion 21 and second terminal portion 22. In the present description, operation pin 8 separates separation portion 23 from both first terminal portion 21 and second terminal portion 22. As illustrated in FIGS. 6 and 7, operation pin 8 breaks conductor 2, thereby separating separation portion 23 from first terminal portion 21 and second terminal portion 22. Operation pin 8 pushes separation portion 23 from above (in this description, via first cooling body 31 and restriction member 4), thereby separating separation portion 23 from first terminal portion 21 and second terminal portion 22. As a result, first terminal portion 21 and second terminal portion 22 are separated apart from each other.

(1.3) Operation

Next, an operation method of disconnect device 1 is described with reference to FIGS. 5 to 7.

When no current is supplied between pin electrodes 72 of gas generator 70 and drive mechanism 7 is not driven, first terminal portion 21 and second terminal portion 22 are electrically connected through separation portion 23 as shown in FIG. 5. Therefore, conductor 2 functions as a conductive path, and a current supplied from external conductive paths electrically connected to first terminal portion 21 and second terminal portion 22 flows through conductor 2.

When a controller or the like of an electric vehicle supplies a current between two pin electrodes 72, drive mechanism 7 is driven, so that heat generating element 73 connected to pin electrodes 72 generates heat. The heat generated by heat generating element 73 ignites fuel 74, so that fuel 74 burns to generate gas. The gas increases a pressure in the internal space accommodating fuel 74 of case 71, thus breaks the wall (lower wall) constituting the internal space, and is introduced into pressurizing chamber 75 through the broken part to increase a pressure in pressurizing chamber 75. Due to the pressure of the gas in pressurizing chamber 75, force acts on operation pin 8 in a direction toward separation portion 23 (downward).

Operation pin 8 is driven against the frictional force of O-ring 65 and is moved downward (moving direction), and the lower surface of operation pin 8 pushes restriction member 4 downward. Restriction member 4 pushed by operation pin 8 is broken at groove 41.

Operation pin 8 moves downward and pushes first cooling body 31 (via restriction member 4) downward from above. First cooling body 31 is pushed by operation pin 8 and is therefore compressed (reduced in volume) in the up-and-down direction.

Operation pin 8 further moves downward and pushes separation portion 23 of conductor 2 (via restriction member 4 and via compressed first cooling body 31) from above. Separation portion 23 is pushed by operation pin 8, so that, as illustrated in FIG. 6, conductor 2 is broken at groove 24 at boundary portion 240 between first terminal portion 21 and separation portion 23 and at groove 24 at boundary portion 240 between second terminal portion 22 and separation portion 23. As a result, separation portion 23 is separated apart from first terminal portion 21 and second terminal portion 22, and first terminal portion 21 and second terminal portion 22 are therefore opened apart from each other. Separation portion 23 separated from first terminal portion 21 and second terminal portion 22 is pushed by operation pin 8 and enters accommodation space SP20 therebelow.

After separating separation portion 23 from first terminal portion 21 and second terminal portion 22, operation pin 8 further moves downward and pushes second cooling body 32 from above (via the followings: restriction member 4; compressed first cooling body 31; and separation portion 23). Second cooling body 32 is compressed (or reduced in volume) by being pushed by operation pin 8.

At this time, in conductor 2, when separation portion 23 is separated from first terminal portion 21 and second terminal portion 22, an arc is sometimes generated between the separated portions of conductor 2. The arc can be generated, for example, to connect first terminal portion 21 and separation portion 23, or to connect between second terminal portion 22 and separation portion 23. In FIG. 6, broken lines schematically represent arc A1 generated between first terminal portion 21 and separation portion 23 and arc A2 generated between second terminal portion 22 and separation portion 23.

As described above, between separation portion 23 and operation pin 8, first cooling body 31 constituted by porous body 30 exists. Therefore, arcs A1, A2 may pass through the gaps in first cooling body 31 and come into contact with porous body 30 (alumina fiber) constituting first cooling body 31. Arcs A1, A2 being in contact with first cooling body 31 can be cooled with their heat absorbed by first cooling body 31. As a result, extinction of arcs A1, A2 is accelerated.

In accommodation space SP20 in which separated separation portion 23 is accommodated, there is disposed second cooling body 32 constituted by porous body 30. Part of arcs A1, A2 can go around toward second cooling body 32 having a high percentage of void and come into contact with porous body 30 (alumina fiber) constituting second cooling body 32. Arcs A1, A2 being in contact with second cooling body 32 can be cooled with their heat absorbed by second cooling body 32. As a result, extinction of arcs A1, A2 is accelerated.

In short, regarding cooling body 3, when separation portion 23 is separated from at least one of first terminal portion 21 and second terminal portion 22 in a state where a current is flowing through conductor 2, operation pin 8 further moves and stops moving at a position where inclined surface 82 of operation pin 8 comes into contact with an inner surface of second hole 952 of first holder 95 of housing 9 (see FIG. 7). That is, housing 9 restricts an excessive movement of operation pin 8. In short, housing 9 includes, on a wall surface forming a space (first space SP1) for accommodating operation pin 8, a restriction portion (the inner surface of second hole 952) that restricts an excessive movement of operation pin 8.

When operation pin 8 stops moving, the first columnar portion of operation pin 8 is interposed between first terminal portion 21 and second terminal portion 22. Therefore, operation pin 8 insulates electrically between first terminal portion 21 and second terminal portion 22.

(1.4) Advantages

As described above, disconnect device 1 of the present exemplary embodiment includes cooling body 3. Cooling body 3 is disposed in internal space 90 of housing 9 and cools the arc or arcs generated in internal space 90. As a result, even if an arc is generated in internal space 90, cooling body 3 cools the arc, so that extinction of the arc is accelerated.

In addition, cooling body 3 has porous body 30 constituted by at least one of a metal oxide and an inorganic oxide. In particular, porous body 30 is configured with a plurality of fibers 300 and is deformable. Therefore, cooling body 3 can have a large surface area, and the arc easily comes into contact with cooling body 3, so that it is possible to further accelerate extinction of the arc. In addition, since cooling body 3 is porous body 30 including fibers 300, handleability of disconnect device 1 is improved.

Note that when operation pin 8 is driven in a state where no current is flowing through conductor 2 or in a state where a magnitude of a current flowing through conductor 2 is small, an arc is not generated in some cases even if conductor 2 is broken.

(2) Variations

The above-described exemplary embodiment is merely one of various exemplary embodiments of the present disclosure. The above-described exemplary embodiment can be variously changed depending on design and the like as long as the object of the present disclosure can be achieved. Hereinafter, variations of the above-described exemplary embodiment will be listed. The variations described below can be applied in appropriate combination. Note that, hereinafter, the above exemplary embodiment may be referred to as a “basic example”.

(2.1) First Variation

Disconnect device 1A of the present variation will be described with reference to FIG. 8. In disconnect device 1A of the present variation, the same components as those of disconnect device 1 of the basic example are assigned the same reference marks, and the description thereof is appropriately omitted.

Figure 8:
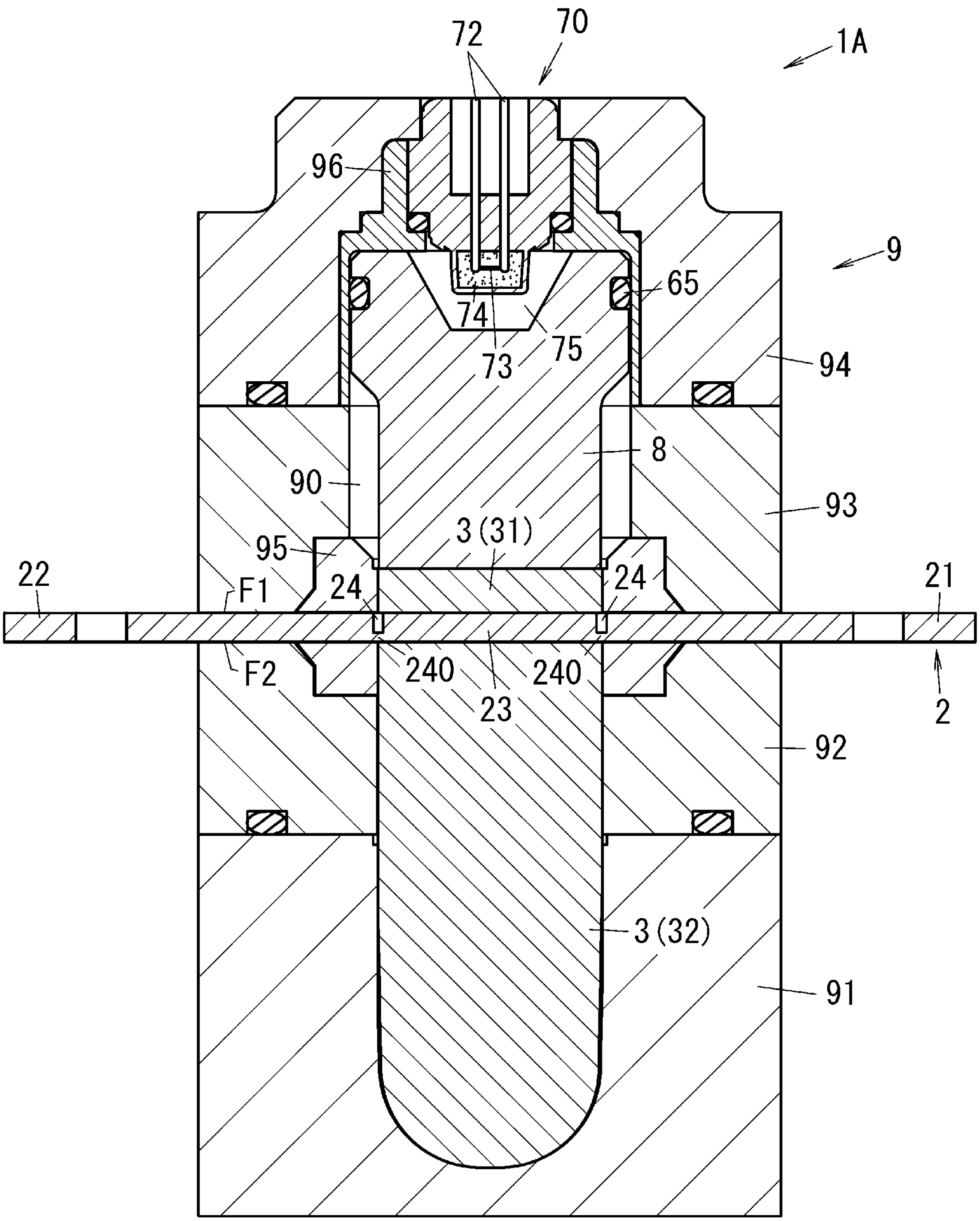
FIG. 8 is a cross-sectional view of a disconnect device according to a first variation.

As illustrated in FIG. 8, disconnect device 1A does not include restriction member 4 (see FIG. 5). The lower end of operation pin 8 is fitted in first hole 951 of through-hole 950, and this structure restricts an upward movement of cooling body 3 (first cooling body 31). The other components are the same as those of disconnect device 1.

In disconnect device 1A of the present variation, first cooling body 31 is in contact with the lower surface of operation pin 8, but the present invention is not limited to this arrangement, and first cooling body 31 does not have to be in contact with the lower surface of operation pin 8.

Also in disconnect device 1A of the present variation, cooling body 3 can accelerate extinction of the arc in the same way as disconnect device 1. Since restriction member 4 is omitted, the configuration is simplified.

However, when first cooling body 31 includes fibers 300, it is preferable that restriction member 4 be provided from the viewpoint of ease of at least one of positioning and initial placement of first cooling body 31.

(2.2) Second Variation

Disconnect device 1B of the present variation will be described with reference to FIG. 9. In disconnect device 1B of the present variation, the same components as those of disconnect device 1 of the basic example are assigned the same reference marks, and the description thereof is appropriately omitted.

Figure 9:
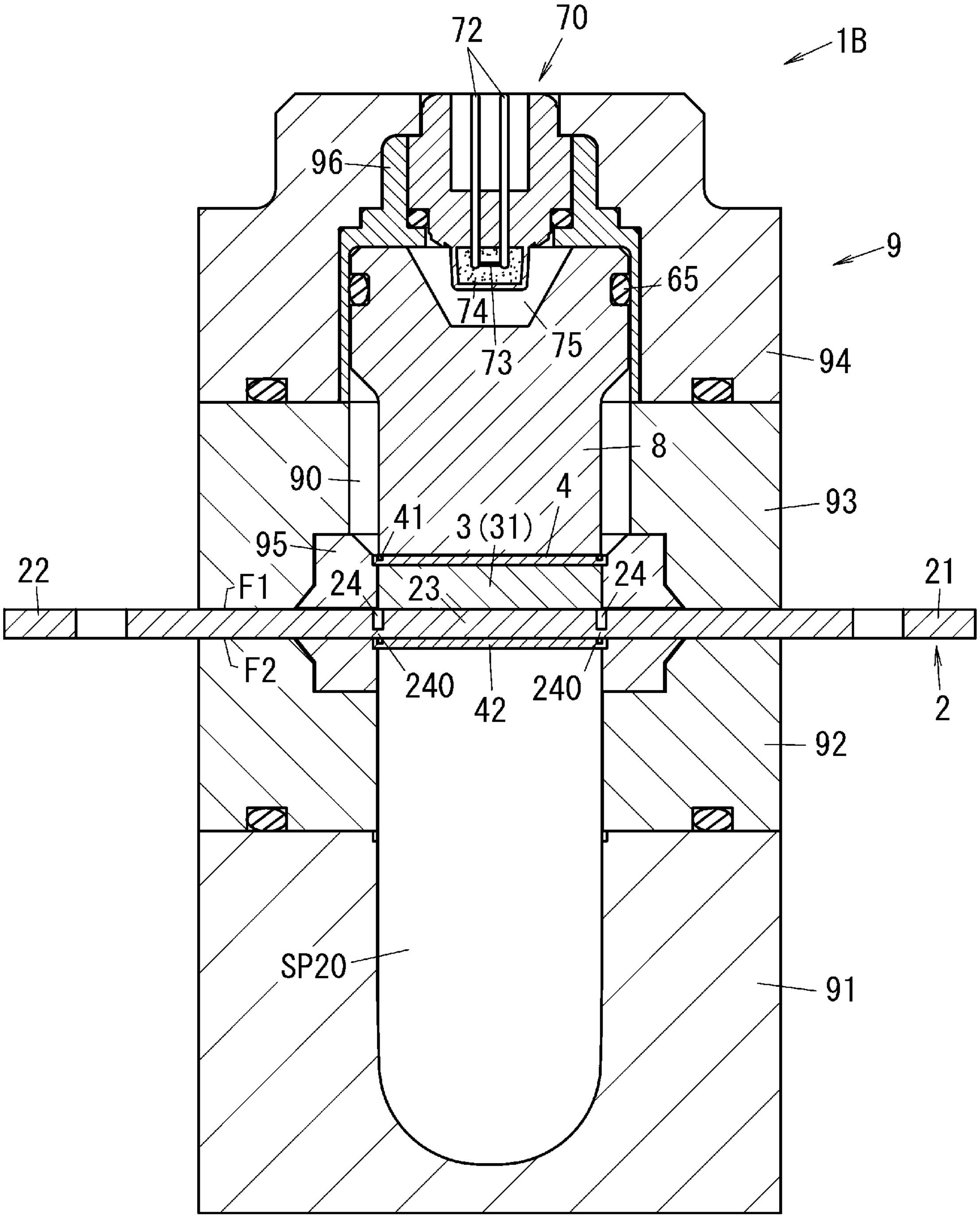
FIG. 9 is a cross-sectional view of a disconnect device according to a second variation.

As illustrated in FIG. 9, in disconnect device 1B, cooling body 3 is disposed only in first space SP1 (more specifically, in gap space SP11), and is not disposed in second space SP2 (accommodation space SP20). That is, cooling body 3 includes first cooling body 31, but does not include second cooling body 32 (see FIG. 5). Disconnect device 1B includes second restriction member 42 in addition to a first restriction member serving as restriction member 4.

Second restriction member 42 has the same disk shape as restriction member 4, and has an annular groove on an upper surface in the same manner as restriction member 4. Second restriction member 42 is fitted in an annular groove formed in the inner peripheral surface of first holder 95 and is thus held by first holder 95. Second restriction member 42 is disposed in internal space 90 of housing 9 to be in contact with the lower surface of conductor 2. Second restriction member 42 partitions between first space SP1 and second space SP2. Second restriction member 42 restricts a movement (downward movement) of cooling body 3 (first cooling body 31).

Also in disconnect device 1B of the present variation, cooling body 3 (first cooling body 31) can accelerate extinction of the arc in the same way as disconnect device 1. Further, since second cooling body 32 is omitted, the configuration can be simplified and the manufacturing cost can be reduced.

Second restriction member 42 may be disposed to be in contact with the upper surface of conductor 2, in other words, between cooling body 3 (first cooling body 31) and conductor 2.

(2.3) Third Variation

Disconnect device 1C of the present variation will be described with reference to FIG. 10. In disconnect device 1C of the present variation, the same components as those of disconnect device 1 of the basic example are assigned the same reference marks, and the description thereof is appropriately omitted.

Figure 10:
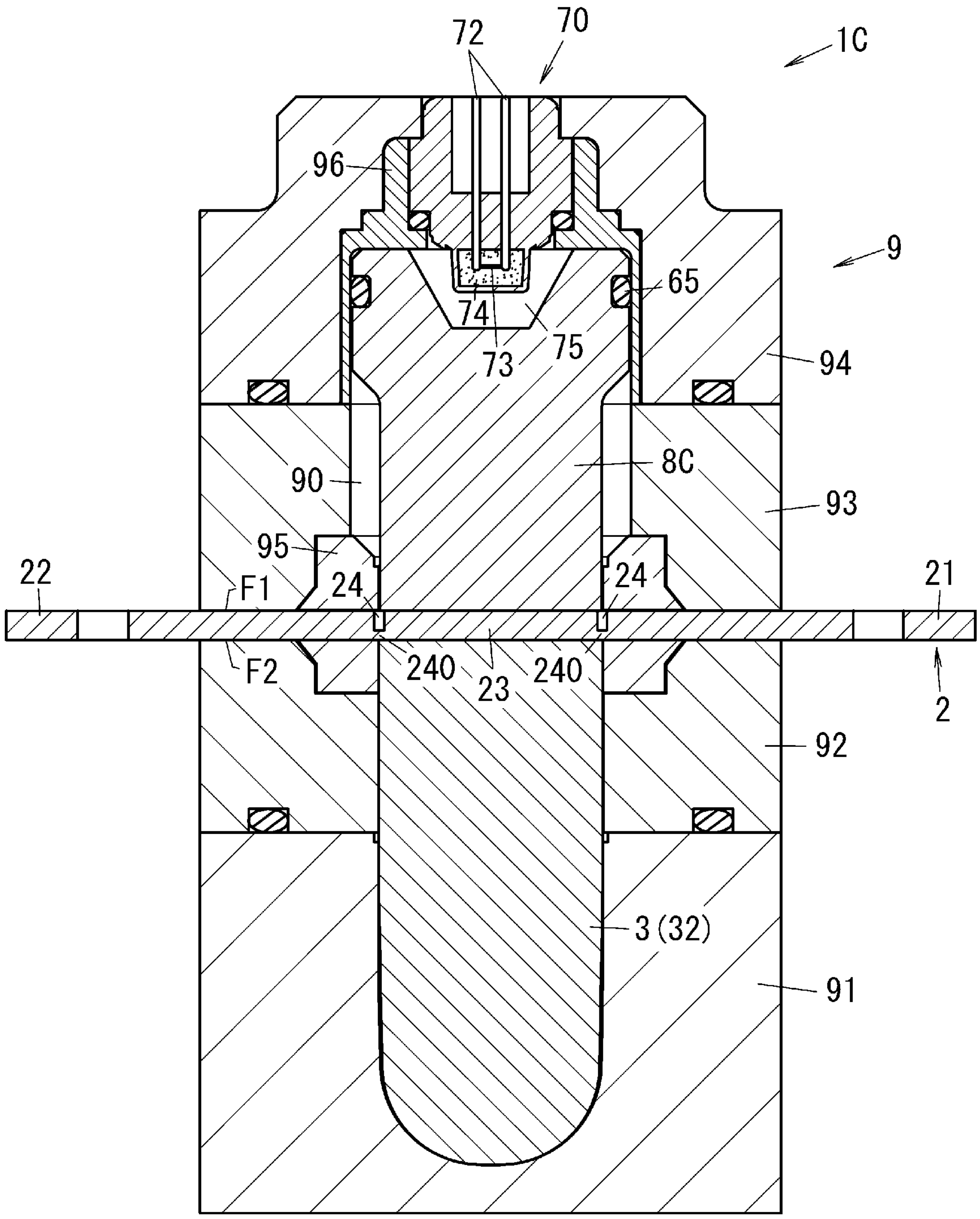
FIG. 10 is a cross-sectional view of a disconnect device according to a third variation.

As illustrated in FIG. 10, in disconnect device 1C, cooling body 3 is disposed only in second space SP2 (more specifically, in accommodation space SP20), and is not disposed in first space SP1 (gap space SP11). That is, cooling body 3 includes second cooling body 32, but does not include first cooling body 31 (see FIG. 5). In addition, in disconnect device 1C, a lower surface of operation pin 8C directly faces (or is in contact with) separation portion 23 of conductor 2. Therefore, when driven by drive mechanism 7, operation pin 8C directly pushes conductor 2 while being in contact with conductor 2, thereby separating separation portion 23 from first terminal portion 21 and second terminal portion 22.

Also in disconnect device 1C of the present variation, cooling body 3 (second cooling body 32) can accelerate extinction of the arc in the same way as disconnect device 1. Further, since first cooling body 31 is omitted, the configuration can be simplified and the manufacturing cost can be reduced.

(2.4) Fourth Variation

Disconnect device 1D of the present variation will be described with reference to FIG. 11. In disconnect device 1D of the present variation, the same components as those of disconnect device 1 of the basic example are assigned the same reference marks, and the description thereof is appropriately omitted.

Figure 11:
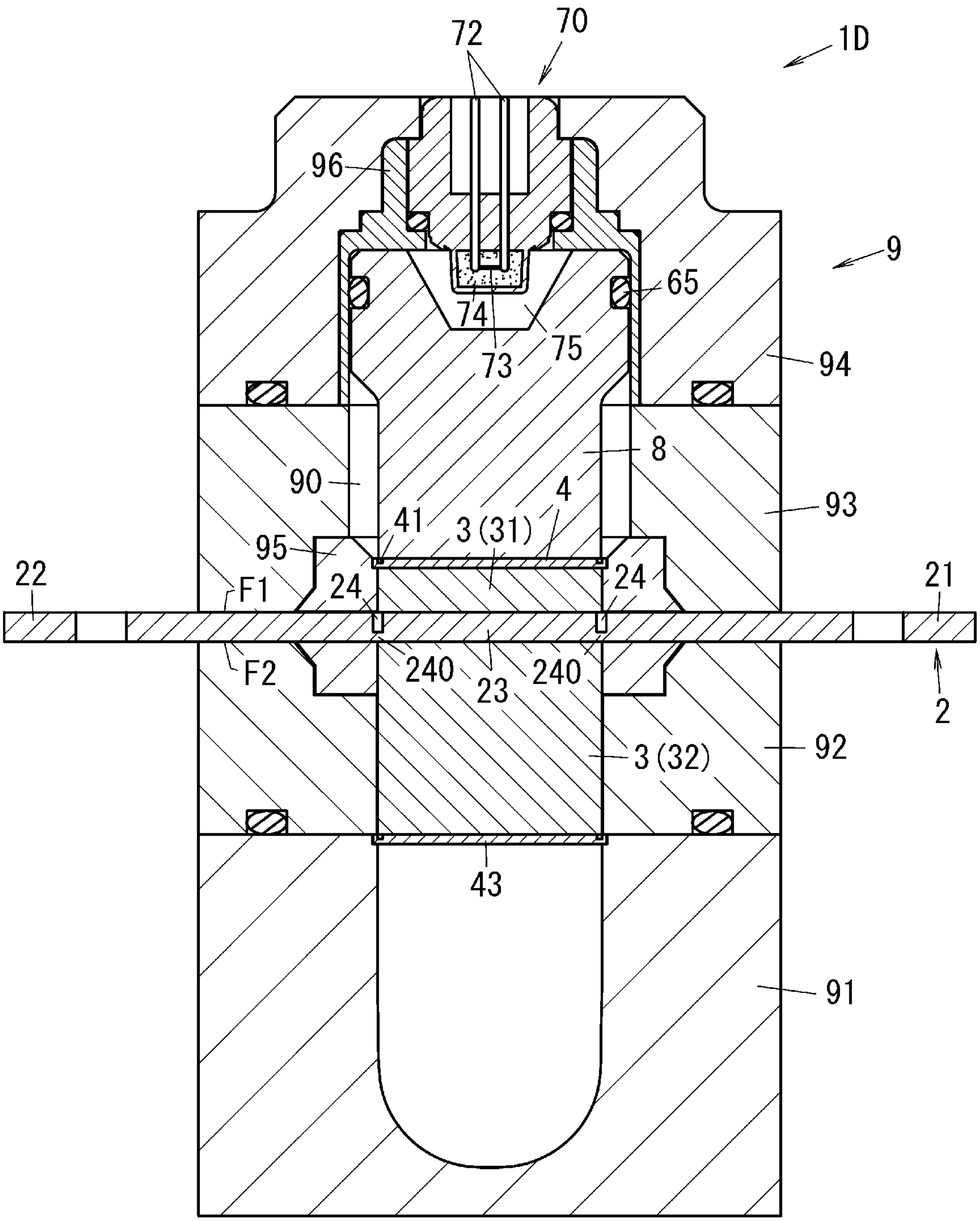
FIG. 11 is a cross-sectional view of a disconnect device according to a fourth variation.

As illustrated in FIG. 11, in disconnect device 1D, second cooling body 32 is disposed not in entire accommodation space SP20 but only in a region close to conductor 2 in accommodation space SP20. Disconnect device 1D includes second restriction member 43 in addition to the first restriction member serving as restriction member 4.

Second restriction member 43 has the same disk shape as restriction member 4, and has an annular groove in an upper surface in the same manner as restriction member 4. Second restriction member 43 is fitted in annular groove 911 (see FIG. 4) formed in the inner peripheral surface of second space SP2 of housing 9, and is thus held by housing 9. Second restriction member 43 separates second space SP2 into two spaces (a space in which second cooling body 32 is disposed, and a space in which second cooling body 32 is not disposed). Second restriction member 43 restricts a movement (downward movement) of cooling body 3 (second cooling body 32).

Also in disconnect device 1D of the present variation, cooling body 3 can accelerate extinction of the arc in the same way as disconnect device 1. Further, since part of second cooling body 32 is omitted, the manufacturing cost can be reduced.

In the present variation, first cooling body 31 may be omitted in the same manner as in disconnect device 1C of the third variation.

(2.5) Fifth Variation

Figure 12:
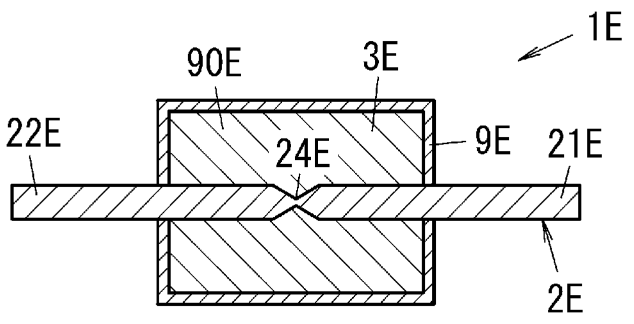
FIG. 12 is a cross-sectional view of a disconnect device according to a fifth variation.

Disconnect device 1E of the present variation will be described with reference to FIG. 12.

Disconnect device 1E of the present variation is a so-called fuse.

Disconnect device 1E includes conductor 2E, housing 9E, and cooling body 3E.

Housing 9E has electrical insulating properties. Housing 9E is formed in a rectangular box shape. Housing 9E has internal space 90E therein.

Conductor 2E includes first terminal portion 21E, second terminal portion 22E, and blow-out portion 24E.

First terminal portion 21E and second terminal portion 22E are each connected to an external conductive path. First terminal portion 21E and second terminal portion 22E are held by housing 9E.

Blow-out portion 24E is accommodated in internal space 90E of housing 9E. Blow-out portion 24E is blown out due to generation of heat when a current larger than or equal to an allowable value flows.

Cooling body 3E is disposed in internal space 90E of housing 9E. Cooling body 3E is disposed in entire internal space 90E. Cooling body 3E is in contact with conductor 2E. Cooling body 3E is in contact with blow-out portion 24E. Cooling body 3E includes porous body 30 (see FIG. 1). Porous body 30 is configured with at least one of a metal oxide and an inorganic oxide.

In disconnect device 1E of the present variation, when a current large than or equal to an allowable value flows through conductor 2E, blow-out portion 24E is blown out due to generation of heat. As a result, first terminal portion 21E and second terminal portion 22E are separated apart from each other. When blow-out portion 24E is blown out in a state where a current is flowing through conductor 2E, an arc may be generated between blown-out parts on conductor 2E. The thus generated arc comes into contact with cooling body 3E, and the heat thereof can be absorbed. In other words, cooling body 3E cools the arc generated in internal space 90E. As a result, extinction of the arc is accelerated.

Also in disconnect device 1E of the present variation, cooling body 3E can accelerate extinction of the arc in the same way as disconnect device 1.

(2.6) Other Variations

In one variation, operation pin 8, 8C may be configured with a plurality of members. Regarding operation pin 8, 8C, for example, the first columnar portion, the second columnar portion, and the third columnar portion may be configured with different members formed of different materials. Portions of operation pin 8, 8C that do not face conductor 2 (first terminal portion 21 and second terminal portion 22) after a movement of operation pin 8, 8C, for example, the second columnar portion and the third columnar portion do not have to have electrical insulating properties.

In one variation, the shape of operation pin 8, 8C is not limited to the exemplified shape, and may be, for example, any polygonal columnar shape.

In one variation, the diameter of grooves 24 and the diameter of operation pin 8, 8C may be smaller than the diameter of first hole 951 of first holder 95. Specifically, the following configuration may be employed: entire boundary portions 240 of conductor 2 (portions to be broken in conductor 2) are located in internal space 90 of housing 9; and part of first terminal portion 21 (an end part closer to separation portion 23) and part of second terminal portion 22 (an end portion closer to separation portion 23) are also located in internal space 90. In this case, cooling body 3 may be in contact with boundary portions 240 and at least part of first terminal portion 21 and part of second terminal portion 22.

In one variation, cooling body 3 does not have to be in contact with conductor 2.

In one variation, first cooling body 31 does not have to be compressively deformable.

In one variation, grooves 24 may be formed on second surface F2 of conductor 2 instead of or in addition to first surface F1 of conductor 2. In other words, grooves 24 may be formed on either of the upper surface and the lower surface of conductor 2.

In one variation, disconnect device 1, 1A to 1E may include a permanent magnet for stretching the generated arc. For example, the permanent magnet may be disposed in a space in housing 9, 9E, or may be embedded in housing 9, 9E.

In one variation, first terminal portion 21, second terminal portion 22, and separation portion 23 do not have to be formed of integrated conductor 2.

In one variation, drive mechanism 7 is not limited to gas generator 70. Drive mechanism 7 may be any mechanism that can separate apart between first terminal portion 21 and second terminal portion 22 from each other.

In one variation, cooling body 3 may be disposed in a region other than the projection region of operation pin 8, 8C. For example, cooling body 3 may be disposed in a recess formed in an inner wall surface of second space SP2 of housing 9.

3. Conclusion

The following aspects are disclosed based on the above-described exemplary embodiment, variations, and the like.

Disconnect device 1 (1A to 1E) of an aspect of the present disclosure includes: conductor 2 (2E) connectable to an external conductive path, housing 9 (9E) including and internal space 90 (90E) and accommodating at least a part of conductor 2 (2E); and cooling body 3 (3E) that is disposed in internal space 90 (90E) and cools an arc generated in internal space 90 (90E). Cooling body 3 (3E) includes porous body 30 configured with at least one of a metal oxide and an inorganic oxide.

According to this aspect, cooling body 3 (3E) has a large surface area, and cooling body 3 (3E) easily comes into contact with an arc. Therefore, it is possible to accelerate extinction of the arc. In addition, even when an arc occurs in internal space 90 (90E), it is possible to reduce an increase in pressure in internal space 90 (90E) of housing 9 (9E).

In disconnect device 1 (1A to 1E) of another aspect, porous body 30 has a fibrous structure and is deformable.

With this aspect, a percentage of void of cooling body 3 (E) can be adjusted.

In disconnect device 1 (1A to 1E) of another aspect, cooling body 3 (3E) is in contact with conductor 2 (2E).

With this aspect, when an arc is generated from conductor 2 (2E), the arc easily comes into contact with cooling body 3 (3E), so that extinction of the arc is accelerated.

Disconnect device 1 (1A to 1D) of another aspect further includes: gas generator 70 that generates gas by combustion of fuel; and operation pin 8 (8C) that is accommodated in internal space 90, is disposed above conductor 2, and is caused to move downward by a pressure of the gas generated in gas generator 70. Conductor 2 includes a terminal portion (first terminal portion 21, second terminal portion 22) and separation portion 23. The terminal portion (first terminal portion 21, second terminal portion 22) is held by housing 9 and is connected to an external conductive path. Separation portion 23 is accommodated in internal space 90 of housing 9 and becomes separated from the terminal portion (first terminal portion 21, second terminal portion 22), as operation pin 8 (8C) moves downward. Cooling body 3 cools an arc generated when separation portion 23 is separated from the terminal portion (first terminal portion 21, second terminal portion 22).

This aspect makes it possible to accelerate extinction of an arc generated when the terminal portion (first terminal portion 21, second terminal portion 22) and separation portion 23 are separated.

In disconnect device 1 (1A, 1C, 1D) of another aspect, the internal space 90 has accommodation space SP20 to accommodate separation portion 23 to be separated from the terminal portion (first terminal portion 21, second terminal portion 22), and cooling body 3 is disposed in accommodation space SP20.

This aspect makes it possible to accelerate extinction of the arc.

In disconnect device 1 (1A, 1B, 1D) of another aspect, operation pin 8 is disposed apart from separation portion 23, and at least a part of cooling body 3 is disposed between operation pin 8 and separation portion 23.

This aspect makes it possible to accelerate extinction of the arc.

In disconnect device 1 (1A, 1D) of another aspect, internal space 90 has accommodation space SP20 to accommodate separation portion 23 to be separated from terminal portion (first terminal portion 21, second terminal portion 22). Operation pin 8 is disposed apart from separation portion 23 of conductor 2, and cooling body 3 is disposed between operation pin 8 and separation portion 23 and is disposed in accommodation space SP20.

This aspect makes it possible to accelerate extinction of the arc.

In disconnect device 1 (1A, 1D) of another aspect, a density of first cooling body 31 disposed between operation pin 8 and separation portion 23 is larger than a density of second cooling body 32 disposed in accommodation space SP20.

This aspect makes it possible to accelerate extinction of the arc.

In disconnect device 1 (1A to 1D) of another aspect, cooling body 3 and separation portion 23 are disposed to overlap each other when viewed from above.

This aspect makes it possible to accelerate extinction of an arc generated when the terminal portion (first terminal portion 21, second terminal portion 22) and separation portion 23 are separated.

In disconnect device 1 (1A to 1D) of another aspect, cooling body 3 is compressed, as operation pin (8, 8C) moves downward.

This aspect makes cooling body (3) less likely to obstruct the movement of operation pin (8, 8C).

Disconnect device 1 (1A to 1D) of another aspect further includes second restriction member 43 that is disposed in internal space 90 of housing 9 and restricts the movement of cooling body 3.

With this aspect, cooling body 3 can be disposed easily.

In disconnect device 1E of another aspect, conductor 2E includes a blow-out portion 24E that is blown out when a current larger than or equal to an allowable value flows.

This aspect makes it possible to accelerate extinction of the arc.

In disconnect device 1 (1A to 1E) of another aspect, the metal oxide contains at least one of aluminum oxide, zirconia oxide, and iron oxide.

This aspect makes it possible to accelerate extinction of the arc.

Disconnect device 1 (1A to 1E) of a 14th aspect is configured such that, in any one of the 1st to 13th aspects, the inorganic oxide contains at least one of silicon oxide, zinc oxide, and magnesium oxide.

This aspect makes it possible to accelerate extinction of the arc.

REFERENCE MARKS IN THE DRAWINGS

1,1A to 1E: disconnect device
2,2E: conductor
21, 21E: first terminal portion
22, 22E: second terminal portion
23: separation portion
24E: blow-out portion
3, 3E: cooling body
31: first cooling body
32: second cooling body
30: porous body
300: fiber
4: restriction member
42, 43: second restriction member
70: gas generator
8, 8C: operation pin
9, 9E: housing
90, 90E: internal space
SP11: gap space (gap)
SP20: accommodation space

The invention claimed is:

1. A disconnect device comprising:
a conductor connectable to an external conductive path;
a housing including an internal space, the internal space accommodating at least a part of the conductor;
a gas generator configured to generate gas by combustion of fuel;
an operation pin that is accommodated in the internal space, is disposed above the conductor, and is configured to move downward under a pressure of the gas generated in the gas generator, wherein
the conductor includes a terminal portion and a separation portion,
the terminal portion is held by the housing and is connected to the external conductive path, and
the separation portion is accommodated in the internal space of the housing and becomes separated from the terminal portion, as the pin moves downward; and
a cooling body that is disposed in the internal space, wherein
the cooling body includes a porous body configured with at least one of a metal oxide and an inorganic oxide,
the porous body has a fibrous structure and is deformable,
as the operation pin moves downward, the cooling body is configured to be compressed in a direction of movement of the operation pin, and
the cooling body is disposed below the separation portion before the separation portion is separated from the terminal portion.

2. The disconnect device according to claim 1, wherein the cooling body is in contact with the conductor.

3. The disconnect device according to claim 1,
wherein the cooling body is configured to cool an arc generated when the separation portion is separated from the terminal portion.

4. The disconnect device according to claim 1, wherein
the internal space has an accommodation space to accommodate the separation portion to be separated from the terminal portion, and
the cooling body is disposed in the accommodation space.

5. The disconnect device according to claim 1, wherein
the operation pin is disposed apart from the separation portion, and
at least a part of the cooling body is disposed between the operation pin and the separation portion.

6. The disconnect device according to claim 1, wherein
the internal space has an accommodation space to accommodate the separation portion to be separated from the terminal portion,
the operation pin is disposed apart from the separation portion of the conductor, and
the cooling body is disposed between the operation pin and the separation portion and is disposed in the accommodation space.

7. The disconnect device according to claim 6, wherein a density of the cooling body disposed between the operation pin and the separation portion is larger than a density of the cooling body disposed in the accommodation space.

8. The disconnect device according to claim 1, wherein the cooling body and the separation portion are disposed to overlap each other when viewed from above.

9. The disconnect device according to claim 1, further comprising a restriction member that is disposed in the internal space of the housing and restricts a movement of the cooling body.

10. The disconnect device according to claim 1, wherein the conductor includes a blow-out portion that is blown out when a current larger than or equal to an allowable value flows.

11. The disconnect device according to claim 1, wherein the metal oxide contains at least one of aluminum oxide, zirconia oxide, and iron oxide.

12. The disconnect device according to claim 1, wherein the inorganic oxide contains at least one of silicon oxide, zinc oxide, and magnesium oxide.

13. A disconnect device comprising:
a conductor connectable to an external conductive path;
a housing including an internal space, the internal space accommodating at least a part of the conductor;
a gas generator configured to generate gas by combustion of fuel;
an operation pin that is accommodated in the internal space, is disposed above the conductor, and is configured to move downward under a pressure of the gas generated in the gas generator, wherein
the conductor includes a terminal portion and a separation portion,
the terminal portion is held by the housing and is connected to the external conductive path, and
the separation portion is accommodated in the internal space of the housing and becomes separated from the terminal portion, as the pin moves downward; and
a cooling body that is disposed in the internal space, wherein
the cooling body includes a porous body configured with at least one of a metal oxide and an inorganic oxide, and
the cooling body is disposed below the separation portion before the separation portion is separated from the terminal portion.

14. The disconnect device according to claim 13, wherein
the cooling body is disposed only below the separation portion before the separation portion is separated from the terminal portion.

15. The disconnect device according to claim 13, wherein
the internal space has an accommodation space to accommodate the separation portion to be separated from the terminal portion, and
the cooling body is disposed in the accommodation space, wherein an entirety of the cooling body is configured to remain within the accommodation space after the separation portion is separated from the terminal portion.

16. The disconnect device according to claim 13, wherein
the internal space has an accommodation space to accommodate the separation portion to be separated from the terminal portion, wherein the accommodation space is sealed from an outside of the housing.

* * * * *